United States Patent [19]

Trinchera

[11] 4,188,524
[45] Feb. 12, 1980

[54] METHOD OF BRAZING TIPS ON CIRCULAR SAW TEETH

[75] Inventor: Luigi Trinchera, Stockton, Calif.

[73] Assignee: California Cedar Products Company, Stockton, Calif.

[21] Appl. No.: 925,117

[22] Filed: Jul. 17, 1978

Related U.S. Application Data

[62] Division of Ser. No. 678,160, Apr. 19, 1976, Pat. No. 4,110,591.

[51] Int. Cl.² .............................................. B23K 1/02
[52] U.S. Cl. ................................. 219/85 CM; 219/77
[58] Field of Search .............. 219/85 CM, 85 CA, 77, 219/76.17, 85 F

[56] References Cited

U.S. PATENT DOCUMENTS

| | | |
|---|---|---|
| 2,673,279 | 3/1954 | Drake . |
| 2,823,295 | 2/1958 | Wilcox . |
| 2,986,108 | 5/1961 | Calehuff . |
| 3,034,378 | 5/1962 | Anderson . |
| 3,063,310 | 11/1962 | Connoy . |
| 3,099,738 | 7/1963 | Sadowski . |
| 3,340,378 | 9/1967 | Miller ............................... 219/85 D |
| 3,463,363 | 8/1969 | Zelna . |
| 3,711,020 | 1/1973 | Zelna . |
| 3,718,799 | 2/1973 | Sawamura . |
| 3,733,934 | 5/1973 | Stevenson . |
| 3,740,521 | 6/1973 | Bullard . |

Primary Examiner—E. A. Goldberg
Attorney, Agent, or Firm—Roger B. Webster

[57] ABSTRACT

The disclosure relates to brazing tips to circular saw blades. The tips are first heated red hot between carbon electrodes. After heating brazing paste is applied to the hot tips and the tips are reheated and brazed to the saw blade.

7 Claims, 6 Drawing Figures

METHOD OF BRAZING TIPS ON CIRCULAR SAW TEETH

CONTINUITY OF APPLICATIONS

This application is a division of co-pending application Ser. No. 678,160, filed Apr. 19, 1976, on APPARATUS FOR BRAZING TIPS ON CIRCULAR SAW TEETH; now U.S. Pat. No. 4,110,591, dated Aug. 29, 1978.

BACKGROUND OF THE INVENTION

U.S. Pat. No. 2,823,295 issued Feb. 11, 1958, to William H. Wilcox, is exemplary of the prior art wherein—in a method and apparatus for brazing tips on circular saw teeth by resistance welding—each saw tooth is interposed in the electrical resistance circuit during brazing of a tip on a tooth. This presented a problem in that the saw tooth became heated—by electrical resistance—during the brazing operation, and at times such heating impaired the temper of the tooth. The present invention was conceived in a successful effort to avoid such problem, while affording certain other advantages over known practices.

SUMMARY OF THE INVENTION

The present invention provides, as an important object, a new and useful method, for brazing, by electrical resistance welding, tungsten carbide tips, or so-called "inserts", on the teeth of either new or used commerical-type circular saws preparatory to sharpening such teeth and tips by a conventional circular saw sharpening machine.

The present invention provides, as another important object, a method, as above, wherein there is employed—to braze each tip on a tooth of a circular saw—an electrical resistance welding circuit which does not require the interposition of the saw, or any tooth thereof, in such circuit, thus protecting the saw and its teeth against undesirable and damaging electrical resistance heating during the tip-applying operation.

The present invention provides, as still another important object, a method, for the purpose described, comprising the steps of (1) clamping an initially separate tip between two opposed carbon electrodes interposed in a resistance circuit; (2) closing the circuit whereby the clamped-in-placed tip is heated red hot; (3) opening the circuit and then delivering a small quantity of brazing paste (flux and solder) on the hot tip; (4) moving an arbor-mounted circular saw until a selected tooth thereof bears on the clamped-in-place tip—the brazing paste then being between said tip and an edge of the tooth; and (5) then re-energizing the resistance circuit whereby the tip again becomes red hot and brazes to said tooth.

The present invention provides, as still another important object, a method—as in the preceding paragraph—practiced by apparatus wherein the preferred instrumentalities include means mounting the opposed carbon electrodes for powered relative axial motion whereby to clamp a tip therebetween, and a brazing paste feeder unit including an applicator, the latter being mounted for movement between a normally retracted point (at which the applicator is inactive) and an advanced point (at which the applicator is active) to deliver a small quantity of brazing paste on the clamped-in-place tip; there being an arbor disposed to support the circular saw for movement such that the selected saw tooth can be brought to bear directly on said clamped-in-place tip.

The present invention provides, as a further object, a method of brazing tips on circular saw teeth which is designed for ease and convenience of practice.

The present invention provides, as a still further object, a practical, reliable, and exceedingly effective method for the purpose described.

DESCRIPTION OF THE PREFERRED EMBODIMENT

Figure 1:
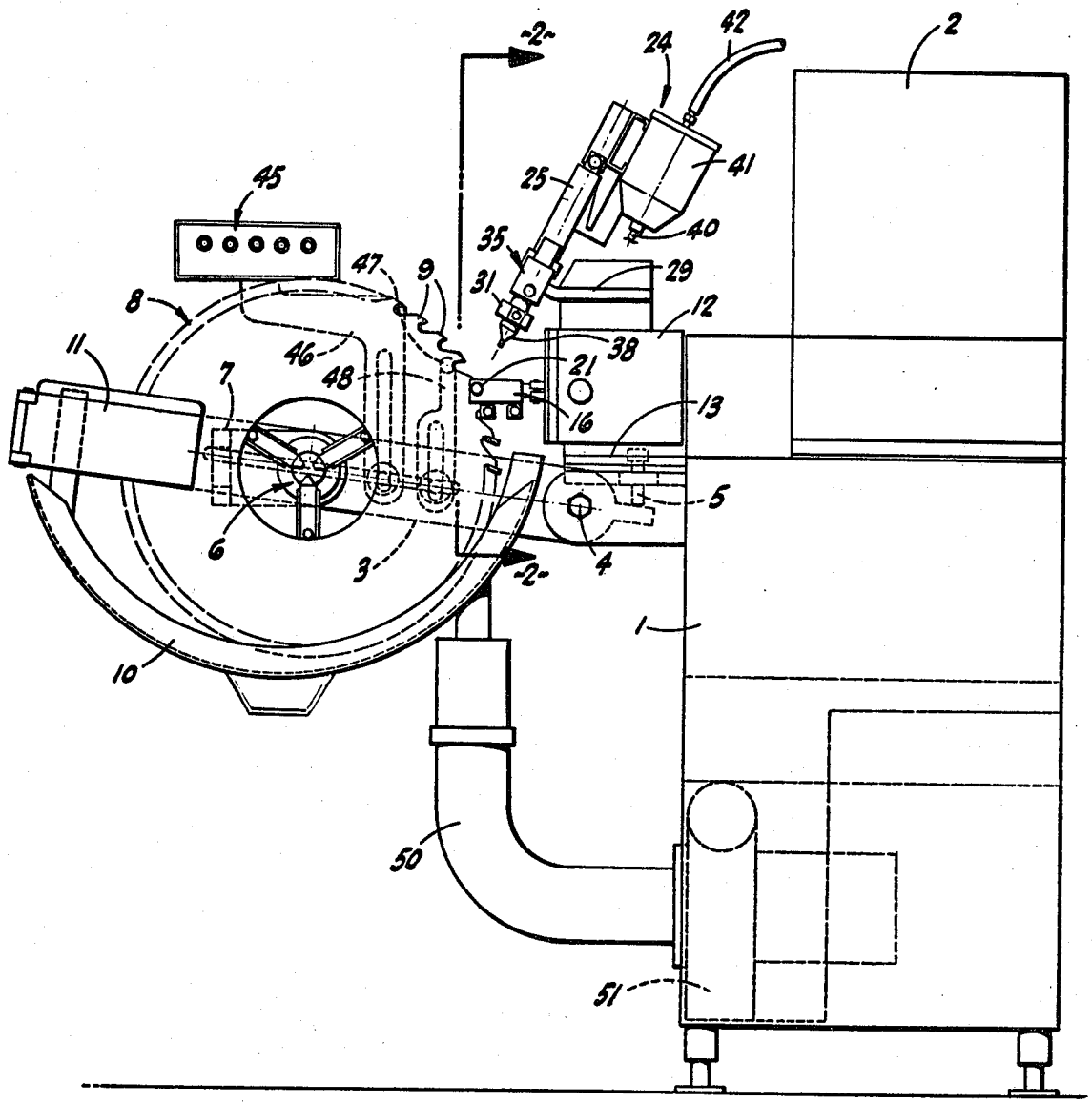
FIG. 1 is a side elevation of the preferred form of apparatus for practice of the herein-claimed method.

Referring now more particularly to the drawings and to the characters of reference marked thereon, the apparatus—for practice of the herein-claimed method—comprises a table 1 which supports a housing 2 for certain control or power-source devices; the same not being of patentable import, nor essential to an understanding of the present apparatus and its functional characteristics.

A supporting arm 3 is fixed in connection with, and projects outwardly from, the table 1 adjacent the top thereof; such arm being pivoted as at 4 for up or down adjustment, but normally held in a selected, fixed position by a stop 5.

Forwardly of the table 1, but intermediate the ends of arm 3, the latter is provided with a transverse axis, expanding-type arbor or mandrel 6 hinged, as at 7, for limited lateral swinging play; the mandrel 6 being adapted to receive and rotatably support a commercial circular saw blade 8 having relatively large teeth 9. As so supported with its axis transversely disposed, the saw blade 8 lies in a longitudinal vertical plane, and with the near teeth 9 positioned in substantially spaced relation to the front of table 1. The lower portion of the mandrel-supported saw blade 8 is embraced by an arcuate guard trough 10 while a swing-away guard plate 11 laps the saw blade outwardly of the mandrel.

An electrode mounting case 12 is fixedly supported in front of the table 1 by bracket means including a horizontal, forwardly projecting plate 13 having an upstanding offset plate 14 at one end thereof; the case being secured in the main to said upstanding plate 14. The stop 5 is fixed in connection with plate 13.

Figure 2:
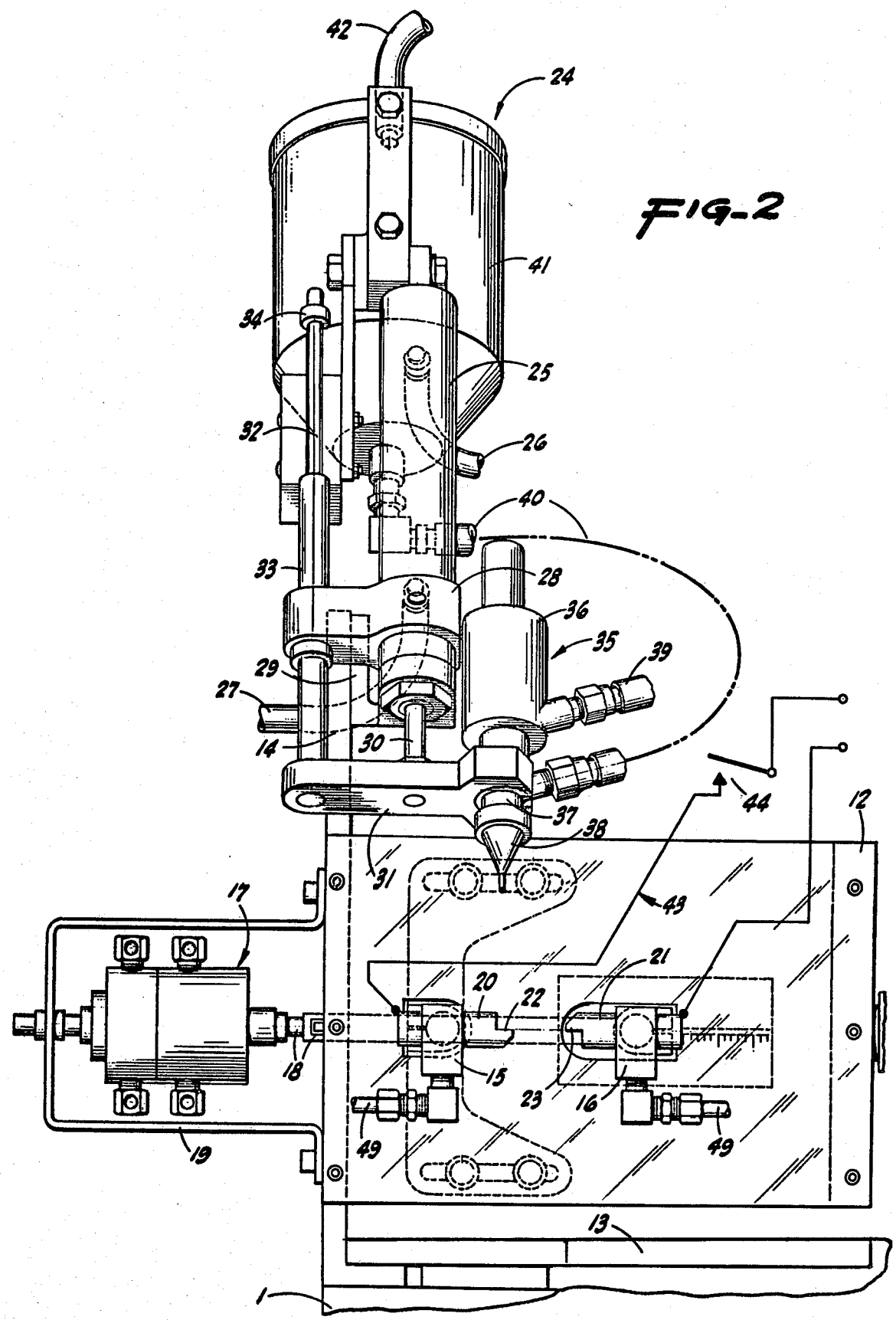
FIG. 2 is an enlarged transverse elevation taken substantially on line 2—2 of FIG. 1.

A pair of horizontal, transversely spaced electrode carriers, indicated at 15 and 16, project forwardly from the case 12; the electrode carrier 5 being fixedly, but adjustably, secured on the case 12 by suitable means such as a bolt-secured slotted mount as shown in FIG. 2. The electrode carrier 16 is mounted in connection with the case 12 for lateral shifting motion and in dielectric relation to the carrier 15; the mounting means being of any suitable form, and preferably similar to that employed in conventional, opposed electrode, spot-welding machines.

The movable electrode carrier 16 is moved laterally to and fro relative to the fixed electrode carrier 15 by means of a two-stage, fluid pressure, actuator unit 17 (flat piston type) coupled to said movable carrier 16 by a connecting rod 18. The actuator unit is secured to, and supported by, a bracket 19 attached to one end of the case 12.

A pair of transverse, horizontal, carbon electrodes 20 and 21 are disposed in adjacent—but initially spaced apart—opposed, end-aligned relation; the electrode 20 extending through and being secured to the fixed carrier 15, while the electrode 21 extends through and is secured to the carrier 16. Thus, the electrode 20 is a normally fixed one of the pair, and the electrode 21 is a movable one.

The fixed electrode 20 is formed on the working end with a projecting, upwardly facing anvil 22, while the movable electrode 21 is formed on the corresponding end with a projecting clamping lip 23 adapted to extend over the lip 22, in flat-faced, mating relation, when said electrode 21 is moved toward the electrode 20.

Extending longitudinally from a point above the assembly of the carriers 15 and 16, and the electrodes 20 and 21 thereon, and at an upward incline inwardly or away from the saw blade 8, the apparatus includes a brazing paste feeder unit, indicated generally at 24. Such brazing paste feeder unit comprises a double-acting fluid pressure power cylinder 25 including hoses 26 and 27 leading to opposite ends of said cylinder; said hoses being incorporated in a valve-regulated, fluid pressure supply and return system (not shown).

At its lower end, the power cylinder 25 includes a supporting collar 28 bracketed, as at 29, to the upper portion of the upstanding plate 14. A piston rod 30 projects from the lower end of power cylinder 25 and is fitted at the free end with a cross head 31.

At one end, the cross head 31 is attached to the lower end of a motion-limiting rod 32 which slidably extends upwardly —parallel to power cylinder 25—through a guide sleeve 33 attached to an offset portion of the collar 28. A stop 34 is secured to rod 32 in spaced relation above the sleeve 33; the stop abutting said sleeve to limit the outward travel of piston rod 30.

At the end opposite that to which the motion-limiting rod 32 is attached, the cross head 31 supports—as part of the feeder unit 24—a brazing paste applicator indicated generally at 35. Such applicator includes a small, longitudinal, fluid pressure power cylinder 36 which, when actuated, operates an internal valve, located approximately at 37, which causes pressure discharge of a small quantity of brazing paste from the lower or free end of a funnel-shaped nozzle 38 on the lower end of said applicator 35. The power cylinder 36 is actuated by fluid pressure fed to said cylinder by a hose 39 included in a valve-controlled fluid pressure system (not shown).

The paste applicator is disposed in a longitudinal vertical plane such that the nozzle 38 is aligned with the anvil 22.

Brazing paste—which is semi-fluid—is fed, at all times and under pressure, to the applicator 35 by flexible tube 40 which extends from the bottom of a paste reservoir 41 fixedly mounted in connection with the upper part of power cylinder 25. The reservoir 41 is likewise maintained under pressure, to feed the paste, by means of a tube 42 which leads from a pressure source (not shown).

The carbon electrodes 20 and 21 are connected to separate leads of an electrical resistance circuit indicated diagrammatically at 43 in FIG. 2, and which circuit includes a control switch 44; the circuit being fed by a transformer (not shown), but which is conventional to resistance welding or brazing apparatus generally.

The apparatus is controlled (i.e., the separate functions are controlled) from a switch panel 45 mounted in a manually accessible position above and somewhat laterally of the saw blade 8; such panel 45 being supported by a bracket 46 upstanding from arm 3.

The desired lateral position of the saw blade 8 is determined by a locating element 47 which bears against one side of said blade; the locating element 47 being secured on a bracket 48 upstanding from arm 3.

The electrode carriers 15 and 16 are hollow and, to prevent overheating thereof, are water-cooled; the cooling water being supplied to, and circulated through, said electrode carriers by means of conduits which lead from a suitable reservoir and pump unit (not shown). The conduits 49 are each, at least in part, of dielectric material, while the conduits for the movable electrode carrier 16 each include a flexible section so as to permit unrestricted movement of said carrier 16.

Fumes from the brazing operation are drawn off by means of a suction tube 50 connected to a motor-driven exhaust fan 51 in table 1; the intake of the suction tube being directly below the electrode assembly.

THE STEPS OF THE METHOD

The above-described apparatus is operated, in the following sequential method steps, to braze a tungsten carbide tip 52 on each tooth 9 of a circular saw blade 8 rotatably supported by the mandrel 6.

Figure 3:
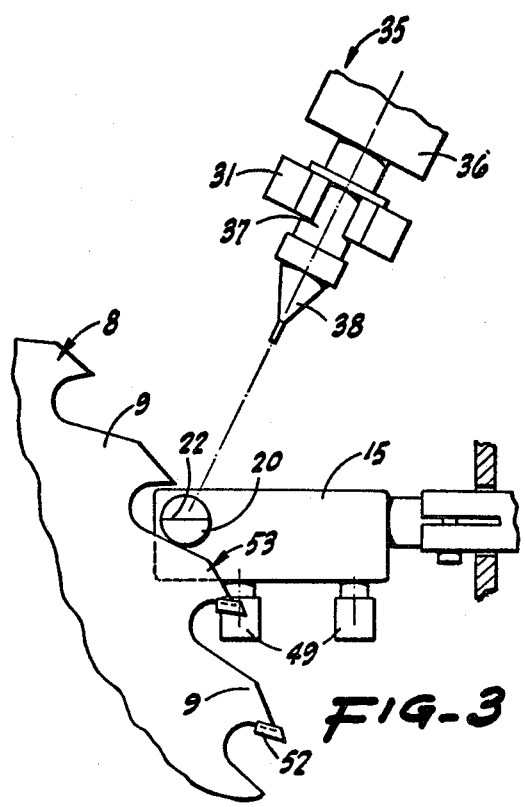
FIG. 3 is an enlarged, fragmentary, somewhat diagrammatic, side elevation showing the fixed electrode, the initial position of the next-to-be-tipped saw tooth relative to the tip-supporting anvil of said fixed electrode, and the paste applicator in retracted relation relative to said anvil.
Figure 4:
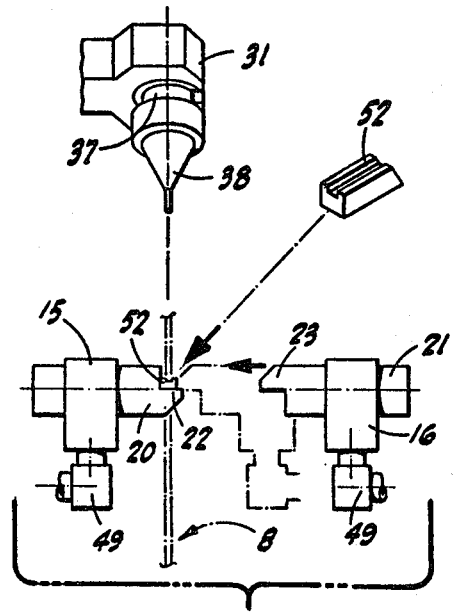
FIG. 4 is a fragmentary, somewhat diagrammatic, transverse elevation of the electrode assembly; the view illustrating the retracted and advanced positions of the movable electrode in full and broken lines, respectively. In the advanced position, the movable electrode is shown as clamping a tip in place preparatory to the brazing operation.
Figure 5:
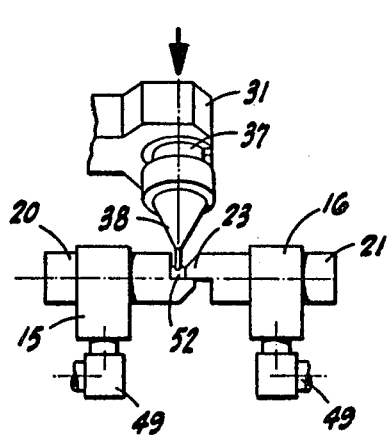
FIG. 5 is a similar view, but shows the normally raised brazing paste applicator in lowered position to feed such paste onto the clamped-in-place tip.

By reference particularly to FIGS. 3-6, inclusive, it is to be understood that—preparatory to each brazing operation—the saw blade 8 is manipulated to dispose the next-to-be-tipped tooth 9 in a position overlying but spaced above the anvil 22 (FIG. 3); the movable electrode 21 being retracted and spaced from the opposed, end-aligned, fixed electrode 20 (FIG. 4 in full lines), while the brazing paste applicator 35 is raised away from said anvil (FIGS. 3 and 4).

As a first step, the operator places an initially separate tungsten carbide tip 52 on the anvil (FIG. 4), and then the actuator unit 17 is energized and functions to advance the movable electrode 21 (FIG. 4 in broken lines) whereby the tip 52 on the anvil 22 is engaged by lip 23 and clamped between the electrodes.

Nextly, the electrical circuit 43 is energized by closing switch 44; this resulting in the anvil-supported, clamped-in-place tip 52 heating red hot. If desired, the switch 44 can be closed in response to operation of the second stage of the actuator unit 17; the stages of the latter being operable in sequence.

After the tip 52 is heated red hot, the circuit 43 is opened, and the brazing paste applicator 35 is then lowered by power cylinder 25 to a point such that the lower end of nozzle 38 lies very close to and directly over (FIG. 5) the clamped-in-place tip 52, and which remains hot.

Figure 6:
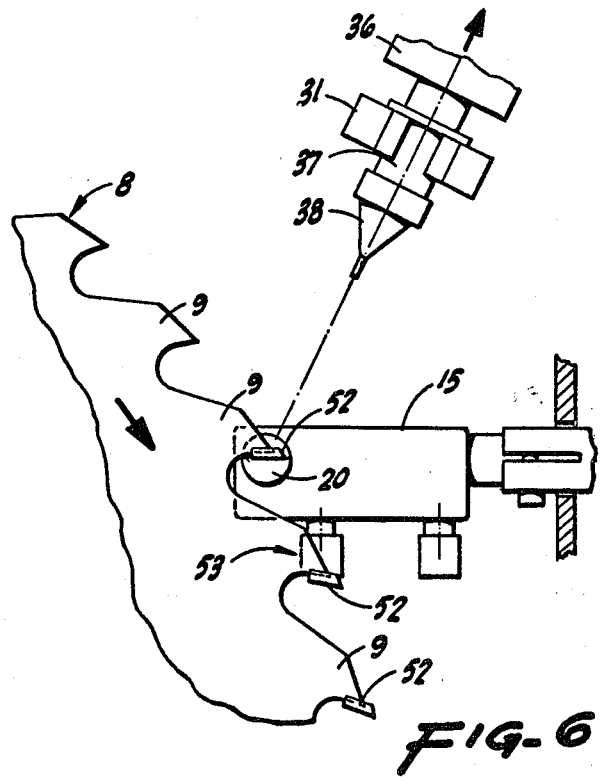
FIG. 6 is a view similar to FIG. 3, but shows the saw tooth bearing on the clamped-in-place tip for brazing of the tip on the tooth.

Immediately such brazing paste applicator 35 is activated whereby a small quantity (a dot) of brazing paste is delivered on top of and spreads over said hot, clamped-in-place tip 52; the applicator 35 then being retracted or raised to its initial or starting position (FIG. 6).

Following the delivery of the brazing paste onto the clamped-in-place tip 52, the saw blade 8 is slightly rotated and the near saw tooth 9 is brought to bear—at the leading edge—directly and forcefully on said clamped-in-place tip 52 (FIG. 6).

The circuit 43 is then closed by switch 44 whereupon such tip 52 is again heated red hot with the result—under the influence of the heat and the brazing paste—that the tip is effectively and positively brazed to the tooth.

Upon completion of each brazing operation, and with all of the parts returned to their initial positions including retraction of the movable electrode 21 away from the fixed electrode 20, the saw blade 8 is shifted slightly laterally about hinge 7 as an axis and only sufficient to permit the just-tipped tooth 53 to be moved downwardly between said electrodes whereby to permit disposition of the next-following tooth in readiness—above anvil 22—for its tip-brazing operation.

The above-described brazing method is repeated on successive teeth, of the saw blade, until all have been tipped. Thereafter, upon removal of the saw blade from the apparatus, the teeth—including the brazed tips—are sharpened in a conventional circular saw sharpening machine.

From the foregoing description, it will be readily seen that there has been produced such a method for brazing tips on circular saw teeth as substantially fulfills the objects of the invention as set forth herein.

While this specification sets forth the present and preferred details of the method, still in practice such deviations from such details may be resorted to as do not form a departure from the spirit of the invention as defined by the appended claims.

I claim:

1. A method of brazing a tip on the tooth of a movably mounted, circular saw blade comprising the sequential steps of clamping an initially separate tip between two opposed electrodes interposed in an electrical resistance circuit, closing the circuit whereby the clamped-in-place tip is heated, opening the circuit, delivering a quantity of brazing paste onto the heated tip, moving the circular saw blade until a selected tooth thereof bears on the clamped-in-place tip, and again closing the circuit whereby the tip is re-heated and brazes to the tooth.

2. A method, as in claim 1, which, after brazing of the tip to the selected tooth, includes the step of unclamping the tip.

3. A method, as in claim 1, wherein the saw blade is rotatably mounted; the method, after brazing of the tip to the selected tooth, including the steps of unclamping the tip, and then rotating the saw blade to dispose another tooth in a position preparatory to the next brazing operation.

4. A method of brazing a tip on a tooth of a movably mounted, circular saw blade comprising the sequential steps—performed with apparatus including opposed, initially spaced electrodes included in a resistance circuit and associated with a power device operative to impart relative approaching motion to said electrodes—of pre-positioning an initially separate tip between the electrodes, imparting relative approaching motion to the electrodes whereby to clamp the tip therebetween, closing the circuit whereby the clamped-in-place tip is heated, opening the circuit, delivering a quantity of brazing paste onto the heated tip, moving the circular saw blade until a selected tooth thereof bears on the clamped-in-place tip, and again closing the circuit whereby the tip is re-heated and brazes to the tooth.

5. A method, as in claim 4, in which the method, after brazing of the tip to the selected tooth, includes the step of imparting relative separating motion to the electrodes whereby to unclamp the tip.

6. A method, as in claim 5, wherein the saw blade is rotatably mounted; the method including the step, after unclamping of the tip, of rotating the saw blade to position another tooth for the next brazing operation.

7. A method, as in claim 4, comprising the step—performed with apparatus including a brazing paste applicator mounted for movement between a non-working position clear of the clamped-in-place tip and a working position closely adjacent the tip—of moving said brazing paste applicator from non-working to working position preparatory to the delivery of brazing paste on the heated tip by said applicator.

* * * * *